US010469349B2

(12) United States Patent
Sampath et al.

(10) Patent No.: US 10,469,349 B2
(45) Date of Patent: Nov. 5, 2019

(54) CONFLICT DETECTION IN A HYBRID NETWORK DEVICE

(71) Applicant: HEWLETT PACKARD ENTERPRISE DEVELOPMENT LP, Houston, TX (US)

(72) Inventors: Rangaprasad Sampath, Bangalore (IN); Ankita Agrawal, Bangalore (IN); Pramod Kumar A S, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 116 days.

(21) Appl. No.: 15/327,101

(22) PCT Filed: Jul. 17, 2015

(86) PCT No.: PCT/US2015/040946
§ 371 (c)(1),
(2) Date: Jan. 18, 2017

(87) PCT Pub. No.: WO2016/011376
PCT Pub. Date: Jan. 21, 2016

(65) Prior Publication Data
US 2017/0180225 A1  Jun. 22, 2017

(30) Foreign Application Priority Data
Jul. 18, 2014 (IN) .......................... 3536/CHE/2014

(51) Int. Cl.
*G06F 15/173* (2006.01)
*H04L 12/26* (2006.01)
(Continued)

(52) U.S. Cl.
CPC ...... *H04L 43/0823* (2013.01); *H04L 12/6418* (2013.01); *H04L 41/0604* (2013.01); *H04L 49/604* (2013.01)

(58) Field of Classification Search
CPC ............. H04L 12/6418; H04L 43/0823; H04L 49/604; H04L 41/0604
See application file for complete search history.

(56) References Cited

U.S. PATENT DOCUMENTS

2013/0044641 A1  2/2013  Koponen et al.
2013/0044751 A1  2/2013  Casado et al.
(Continued)

FOREIGN PATENT DOCUMENTS

WO  WO-2014031207 A1  2/2014

OTHER PUBLICATIONS

Igor Fernando Farias et al., "Legacyflow: Bringing Openflow to Legacy Network Environments," Aug. 2011, pp. 1-2, Available at: <changeofelia.info.ucl.ac.be/pmwiki/uploads/SummerSchool/Program/poster_004.pdf>.
International Search Report and Written Opinion, International Application No. PCT/US2015/040946, dated Oct. 29, 2015, pp. 1-8, KIPO.
(Continued)

*Primary Examiner* — Cheikh T Ndiaye
(74) *Attorney, Agent, or Firm* — Jaffery Watson Mendonsa & Hamilton

(57) ABSTRACT

A method, system, and computer-readable storage device for detecting conflicts in a hybrid network device is described herein. A hybrid network device may receive a local controller command from a network management device (e.g., a laptop, operated by a network administrator, executing a command line interface). The hybrid network device may convert the local controller command to a software defined command format. The hybrid network device may detect a lack of conflict between the converted local controller command and active flows represented in an active flow repository. Based on the detected lack of conflict, the hybrid network device may update a traffic forwarding table of the hybrid network device in accordance to the local controller command.

20 Claims, 5 Drawing Sheets

(51) Int. Cl.
*H04L 12/64* (2006.01)
*H04L 12/931* (2013.01)
*H04L 12/24* (2006.01)

(56) References Cited

U.S. PATENT DOCUMENTS

| | | |
|---|---|---|
| 2013/0259465 A1 | 10/2013 | Blair |
| 2013/0276135 A1 | 10/2013 | Conklin et al. |
| 2013/0318243 A1 | 11/2013 | Chinthalapati et al. |
| 2014/0025749 A1* | 1/2014 | Glowacki ............ H04L 12/1895 709/206 |
| 2014/0112190 A1 | 4/2014 | Chou et al. |
| 2014/0122668 A1 | 5/2014 | Nieminen |
| 2014/0317684 A1* | 10/2014 | Porras ............... H04L 63/20 726/1 |
| 2015/0381428 A1* | 12/2015 | Ong ............... H04L 41/12 709/223 |

OTHER PUBLICATIONS

John Vogel, "Some Openflow Technical Issues and Their Implications," Aug. 8, 2013, pp. 1-13.
Stefano Vissicchio et al., "Safe Updates of Hybrid SDN Networks," Oct. 11, 2013, pp. 1-12, Available at: <vanbever.eu/pdfs/vanbever_hybrid_sdn_tr_2013.pdf>.
Wikipedia, "Simple Network Management Protocol", available online at <https://en.wikipedia.org/w/index.php?title=Simple_Network_Management_Protocol&oldid=755984667>, Dec. 21, 2016, 11 pages.
The Open Networking Foundation, "OpenFlow Switch Specification", Version 1.3.0 ( Wire Protocol 0x04 ), Jun. 25, 2012, 106 pages.
OpenFlow Notifications Framework, OpenFlow Management, Version 1.0, ONF TS-014, Oct. 15, 2013, 18 pages.
Open Networking Foundation, "OpenFlow Management and Configuration Protocol" (OF-Config 1.2), Jun. 1, 2010, 44 pages.
McKeown et al, "OpenFlow: Enabling Innovation in Campus Networks", Mar. 14, 2008, 6 pages.

* cited by examiner

CONFLICT DETECTION IN A HYBRID NETWORK DEVICE

BACKGROUND

Software defined networks are computer-based systems used in communication networks. Software defined networks allow network administrators to manage network services through abstraction of lower level functionality. This is done by decoupling the system that makes decisions about where traffic is sent (the so called "control plane") from the underlying systems that forward traffic to the selected destination (the so called "data plane").

BRIEF DESCRIPTION OF DRAWINGS

Examples are described in detail in the following description with reference to implementations shown in the following figures.

DETAILED DESCRIPTION

Figure 1:
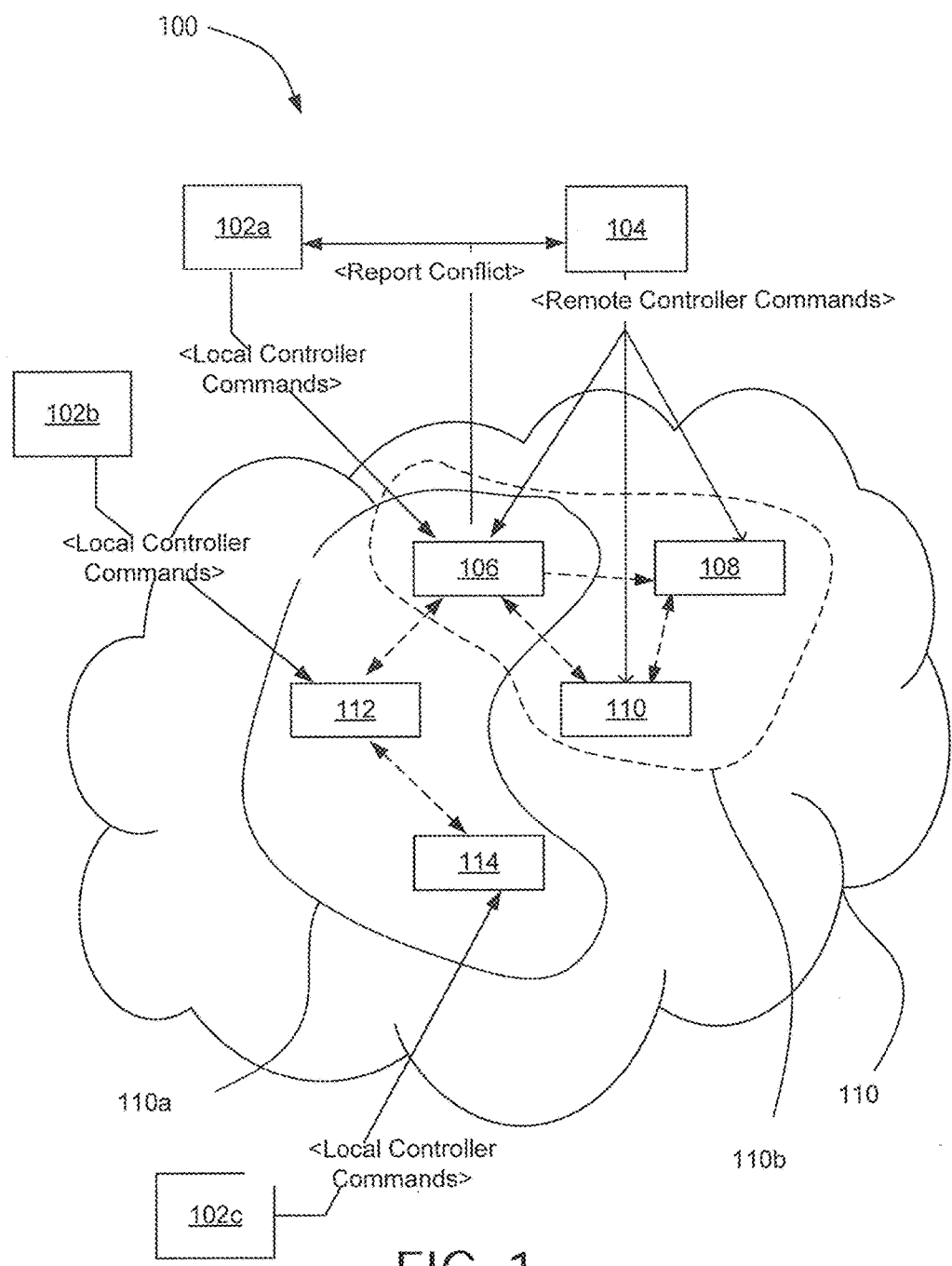
FIG. 1 is a system diagram that illustrates an example of a hybrid networking system configured to detect and report conflicts between local controller commands and remote controller commands received by a hybrid network device.

This disclosure discusses, among other things, methods, systems, and computer-readable storage devices that may detect a conflict between a local controller command and a remote controller command in a hybrid network device. A local controller command, as used herein, may refer to a command sent to a coupled network device that affects the layer 2/layer 3 processing, or any other network feature or protocol that may be supported on a network device, for that coupled network device. As used herein, a coupled network device is a network device that includes both a control plane (also referred to as a local controller) and a data plane. In some cases, the local controller command may (de)activate a layer 2/layer 3 feature (otherwise simply referred to as a "feature") supported by the network device, such as initiating a protocol, specifying an access control list ("ACL"), specifying a quality of service ("QoS"), or any other suitable feature that manages a resource of the network device. In a coupled network device, the features may be managed by the local controller operating on the coupled network device.

In comparison, a remote controller command may refer to a command that a remote controller sends to a decoupled network device. A decoupled network device, as used herein, is a network device executing a data plane that operates under the direction of a control plane executed by a separate device (e.g., the remote controller). An example of a system that includes a remote controller and a decoupled network device is a software defined network system. Further, OpenFlow is an example of a protocol used by a remote controller and a decoupled network device to communicate remote controller commands. In some cases, the remote controller command may affect the data plane of a network device using match-action pairs programmed in hardware tables of the network device. In an example, properties of incoming traffic are compared against match primitives of the match-action pairs and, if the properties of the incoming traffic match a match primitive, the decoupled network device may forward the incoming traffic according to the action primitive that corresponds to the matching match primitive. A match-action pair used to forward traffic in a decoupled network device may be referred to as an active flow.

In some cases, a network device may be configured to receive both local controller commands and remote controller commands. Such a network device that can process both local controller commands and remote controller commands is referred to herein as a hybrid network device. A hybrid network device may be capable of exchanging data between portions of a network that deploy a software defined network model and portions of a network that deploy a layer 2/layer 3 network model.

In some cases, a local controller command may conflict with a remote controller command. A conflict may exist between a local controller command and a remote controller command when those commands conflict in functionality, resource sharing, and the like. For example, a local controller command may instruct the data plane to forward packets with a given destination address to the switch stack operating on the hybrid network device. Additionally, a remote controller command may instruct the data plane to forward packets with the given destination address to the remote controller that manages the data plane of the hybrid network device. Because both the local controller command and the remote controller command instruct the data plane of the hybrid network device to send packets with the given destination address to different locations (e.g., a switch stack operating on the hybrid network device versus a remote control plane), the behavior of the hybrid network device would be unclear. As such, this situation is an example of a conflict that can occur within a hybrid network device. Other types of conflicts are possible.

According to an example, a hybrid network device may receive a local controller command from a network management device (e.g., a laptop, operated by a network administrator, executing a command line interface). The hybrid network device may convert the local controller command to a software defined command format. The hybrid network device may detect a lack of conflict between the converted local controller command and active flows represented in an active flow repository. Based on the detected lack of conflict, the hybrid network device may update a traffic forwarding table of the hybrid network device in accordance to the local controller command.

According to another example, a hybrid network device may receive a remote controller command from a remote controller. The hybrid network device may detect a lack of conflict between the remote controller command and an active feature represented in a normalized command repository. Based on the detected lack of conflict, the hybrid network device may update a traffic forwarding table of the hybrid network device in accordance to the software defined command.

These and other examples are now described in greater detail.

FIG. 1 is a system diagram that illustrates an example of a hybrid networking system 100 configured to detect and report conflicts between local controller commands and remote controller commands received by a hybrid network device. The hybrid networking system 100, as shown in FIG. 1, includes network management devices 102a-c, a remote controller 104, and a network 110.

The network management devices 102a-c may be computer devices (e.g., laptops, tablets, remote desktops, mobile phones, or the like) configured to send local controller commands to a coupled network device. To clarify, a local controller command is not initiated by a local controller but is instead directed to a local controller operating on coupled network device. As described above, a coupled network device may be a network device that includes both a control plane and a data plane. In some cases, a network administrator may manage a coupled network device by physically or wirelessly connecting, directly or indirectly, a network management device to the coupled network device that is being updated. The network management devices 102a-c may interface with a coupled network device using a command line interface, simple network management protocol ("SNMP"), secure shell ("SSH"), proprietary protocols, or the like.

The remote controller 104 may be a computer device configured to manage flow control within the network 110 (or portions therein) to enable intelligent networking. A remote controller may use protocols, such as OpenFlow, to tell network devices such as switches where to send packets. That is, in some cases, the remote controller 104 may use OpenFlow to configure network devices and choose the network path for application traffic. As discussed above, the decoupled network device may store remote controller commands in the form of match-action pairs in a hardware table. The decoupled network device may then manage the flow of incoming traffic according to the match action pairs.

The network 110 may be a communication system configured to exchange data between interconnected computer devices. The network 110 may be any communication system utilizing any one of a number of transfer protocols (e.g., hypertext transfer protocol ("HTTP")). Examples of communication systems include a local area network ("LAN"), a wide area network ("WAN"), the Internet, mobile telephone networks, Plain Old Telephone ("POTS") networks, wireless data networks (e.g., Wi-Fi® and WiMax® networks), and so on.

As shown in FIG. 1, the network 110 may include local controller-based network paths 110a and remote controller managed network paths 110b. The local controller-based network paths 110a may be formed by interconnections between network devices 106, 112, 114. The network devices 106, 112, 114 may be coupled network devices. As discussed above, a coupled network device may be a network device that includes both a data plane and a control plane. The control plane of a coupled network device is populated by routing protocols (such as, for example, open shortest path first ("OSPF"), intermediate system to intermediate system ("ISIS"), border gateway protocol ("BGP"), and others) or by static routes configured by an administrator. Routes detected by one coupled network device are advertised to neighboring coupled network devices. This information is in turn sent down to the forwarding table ("FIB") of the data plane in every such network device. In this way, some examples of a control plane (standardized networking protocols) can add forwarding state to the data plane of network devices.

The remote controller managed network paths 110b may be formed by interconnections between network devices 106, 108, 110. In some cases, the remote controller 104 may use OpenFlow to specify the path of network packets through network devices 106, 108, 110. OpenFlow allows remote administration of a network device's packet forwarding tables, by adding, modifying and removing packet matching rules and actions. This way, routing decisions can be made periodically or ad hoc by the remote controller and translated into rules and actions with a configurable lifespan, which are then deployed to a network device's flow table, leaving the actual forwarding of matched packets to the network device at wire speed for the duration of those rules. Packets which are unmatched by the network device can be forwarded to the remote controller 104. The remote controller 104 can then decide to modify existing flow table rules on one or more network devices or to deploy new rules, to prevent a structural flow of traffic between network devices and controller. Other examples of actions that can be taken if the packets are unmatched include, but are not limited to, dropping the packets, send the packets to the switch software stack, or forward the packet out of a port.

As the network device 106 is part of both the local control-based network paths 110a and the remote controller managed network paths 110b, this network device 106 may be referred to as a hybrid network device.

Figure 2:
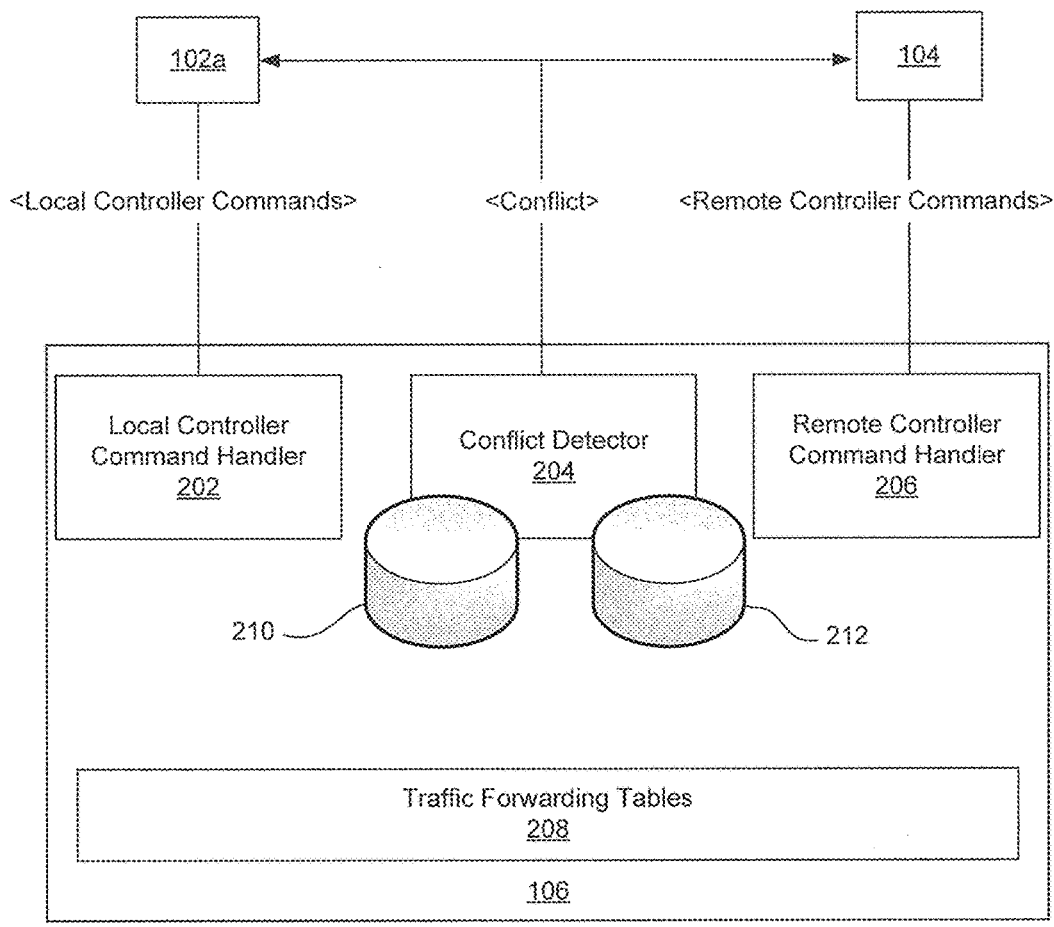
FIG. 2 is a block diagram illustrating modules of a hybrid network device, according to an example.

FIG. 2 is a block diagram illustrating the modules of the hybrid network device 106, according to an example. The hybrid network device 106 may include a local controller command handler 202, a conflict detector 204, a remote controller command handler 206, and a traffic forwarding table 208. The local controller command handler 202 may be a computer-implemented module configured to update the traffic forwarding table 208 according to the local controller commands received from the network management devices 102a-c. Similarly, the remote controller command handler 206 may be a computer-implemented module configured to update the traffic forwarding table 208 according to remote controller commands received from the software defined controller 104.

The conflict detector 204 may be a computer implemented module configured to compare commands received from one of the network management devices 102a-c or the remote controller 104 with active features or flows to detect whether the command conflicts with any of the active features or flow. Thus, in one case, the conflict detector 204 may be configured to detect whether a remote controller command will conflict with active features or, additionally or alternatively, a local controller command conflicts with active flows.

As FIG. 2 shows, the conflict detector 204 may access a number of data stores, such as a normalized command repository 210 and an active flow repository 212. The normalized command repository 210 and the active flow repository 212 may each be a computer-implemented module or logic that stores active features enabled through the local controller of the hybrid network device 106 and active flows enable via the remote controller 104, respectively. In some cases, the normalized command repository 210 may represent an active feature using a format used by remote controller commands. For example, the normalized command repository 210 may represent local controller commands that have subsequently been converted into match-action pairs.

The traffic forwarding table 208 may be a computer-implemented module or logic (e.g., application specific integrated circuit ("ASIC") table) that is configured to forward packets from one device to another device. As the network device 106 is a hybrid network device, the traffic forwarding table 208 may be configured to exchange packets via a layer 2/layer 3 approach (e.g., using a FIB, LFIB, MAC-address-table, and the like) or an OpenFlow approach (e.g., using a table of match and action primitives).

Figure 3:
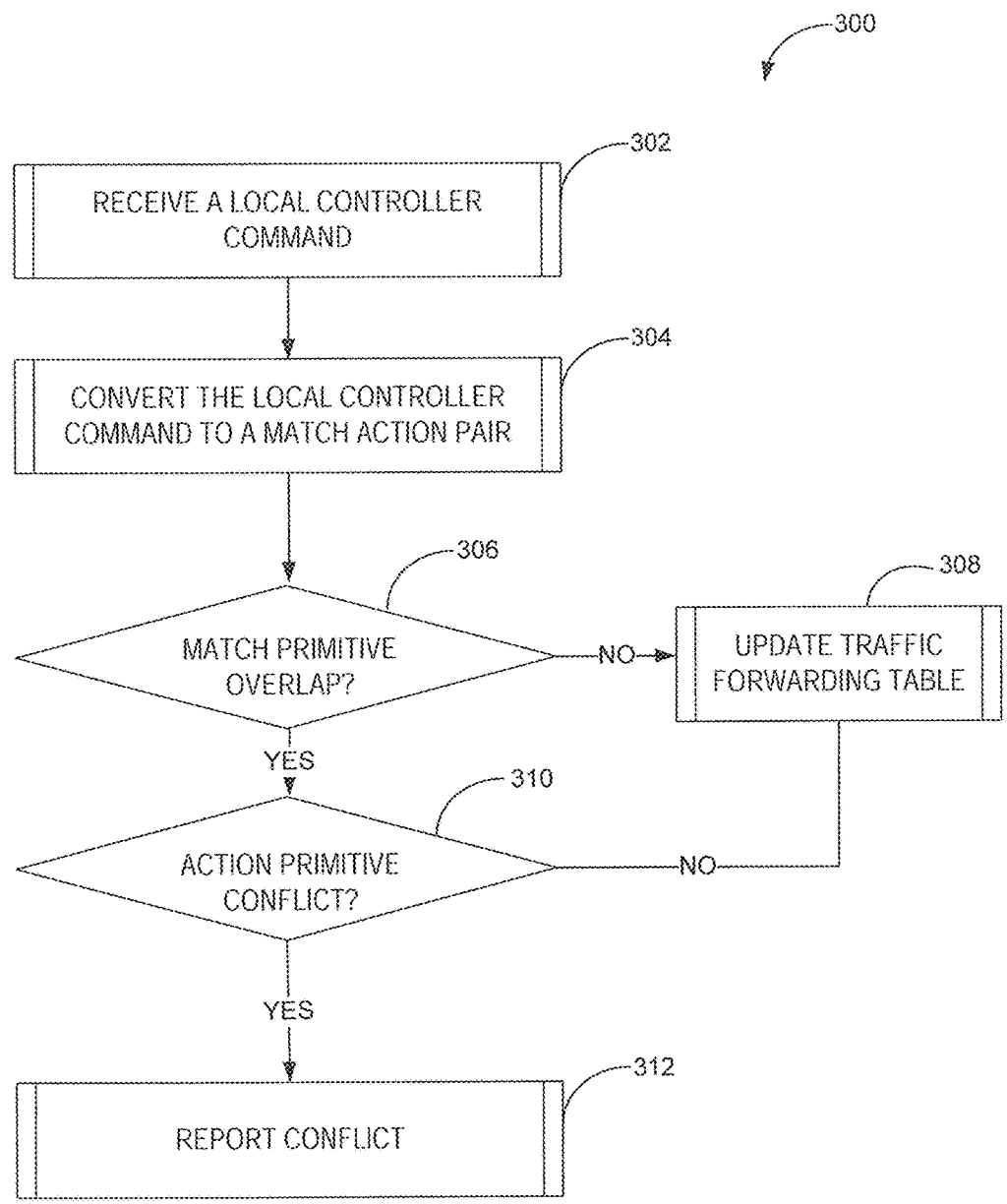
FIG. 3 is a flowchart illustrating a method of detecting a conflict between a local controller command and an active flow, according to an example.

The operation of the components and modules shown in FIGS. 1 and 2 are now described in greater detail. FIG. 3 is a flowchart illustrating a method 300 of detecting a conflict between a local controller command and an active flow, according to an example. The method 300 may be performed by the modules, logic, components, or systems shown in FIGS. 1 and 2 and, accordingly, is described herein merely by way of reference thereto. It will be appreciated that the method 300 may, however, be performed on any suitable hardware.

At operation 302, the local controller command handler 202 of the hybrid network device 106 may receive a local controller command from the network management device 102a. By way of example and not limitation, the local controller command may be a command to the hybrid network device 106 to execute a given protocol, enable a quality of service ("QoS") feature, update an access control list ("ACL"), or any other suitable layer 2/layer 3 feature.

At operation 304, the conflict detector 204 may convert the local controller command to a remote controller command format, such as a match-action pair, as may be used by OpenFlow, for example. By way of example and not limitation, the conflict detector 204 may receive a local controller command that specifies an ACL on a port with implicit deny. An example syntax for such a local controller command may be:

permit ip 10.0.0.1/23 any
deny ip any any

The above local controller command may apply the ACL to a port interface, say 23, of the hybrid network device 106, where packets with a source IP address of 10.0.0.1 is allowed (as designated by the 'permit' keyword) through port 23 but any other source IP address will be denied (as designated by the 'deny' keyword) through port 23. The conflict detector 204 may convert the above local controller command syntax to the following match primitives:

a. {IN_PORT==23, ETHERTYPE==0x0800 (IP), SOURCE IP==10.0.0.1}
b. {IN_PORT==23, ETHERTYPE==0x0800}

The match primitive in Rule a above will match all packets that come in to the network device via port number 23 (IN_PORT==23). This primitive will only match IP protocol packets which is signified by the Ethertype being 0x0800 that stands for the IP protocol. Further this primitive will match all packets that come in with the source IP address as 10.0.0.1. The match primitive in Rule b above will match IP protocol packets that come in via port 23. Note that in this case illustrated, Rule a has a higher priority than Rule b (i.e., packets coming into the switch will be considered for a match with Rule a first and then Rule b.

In addition to converting the local controller command to a corresponding match primitive (or match primitives), the conflict detector 204 may convert the above local controller command syntax to the following action primitives:

a. NORMAL
b. DROP

Where the 'NORMAL' action primitive allows the IP protocol traffic that came in via port 23 having a source IP address of 10.0.0.1, to pass through unaffected and the DROP' action primitive causes the network device to drop all other IP traffic (except that having a source IP address of 10.0.0.1) coming in via port 23. In operation, match primitive a. corresponds to action primitive a. Thus, if properties of incoming traffic matches the match primitive a., the hybrid network device 106 may execute the action primitive a. because action primitive a. corresponds to match primitive a. The same may be true for the match primitive b. and the action primitive b.

Additional examples of conversions between local controller commands and remote controller commands are described in greater detail below. For the purpose of illustration, and not limitation, the discussion of the method 300 of FIG. 3 continues with reference to the above example local controller command syntax, match primitives, and action primitives. At decision 306, the conflict detector 204 determines whether a match primitive of the match-action pair overlaps with an active flow. For example, the conflict detector 204 may compare the match primitives of the converted local controller command against the active flows stored in the active flow repository 212. The match primitives of two rules can either be an exact match—both rules have the match primitive to be match on source IP address being 10.0.0.1. It could be that the match primitives of two rules could overlap on some fields—consider one rule having a match primitive of in_port being 23 and source IP address of 10.0.0.1 and the other rule just having a match primitive of source IP address being 10.0.0.1. Using the above ACL example, if the active flow repository 212 includes the following match primitive for an active flow "{IN_PORT==23, ETHERTYPE==0x0800 (IP), SOURCE IP==10.0.0.1}" then the match primitive of the converted local controller command would match a match primitive stored in the active flow repository 212.

If a match primitive of the converted local controller command does not overlap with an active flow stored in the active flow repository 212, the conflict detector 204 may signal to the local controller command handler 202 that no conflict exists, and, at operation 308, the local controller command handler 202 may update the traffic forwarding table 208 (and a local controller) to include the feature represented in the local controller command. Further, the conflict detector 204 may add the match primitives and action primitives of the converted local controller command to the normalized command repository 210.

If the conflict detector 204, instead, does determine that a match primitive of the converted local controller command overlaps with an active flow stored in the active flow repository 212, the conflict detector 204 then determines, at decision 310, whether an action primitive of the converted local controller command conflicts with an active flow in the active flow repository 212. For example, consider the match primitives of two rules, rule a and rule b to overlap. Their actions would be in conflict if say the action primitive of rule a were to specify a drop whereas the action primitive of rule b were to specify sending the packets that matched to the remote controller. By way of example and not limitation, if the match primitive of the active flow matches match primitive a. (e.g. {IN_PORT==23, ETHERTYPE==0x0800 (IP), SOURCE IP==10.0.0.1}), a conflict does not exist when the action primitive of the active flow is NORMAL because the action primitive of the converted local controller command is also NORMAL. As another example, again, if the match primitive of the active flow matches match primitive a. (e.g. {IN_PORT==23, ETHERTYPE==0x0800 (IP), SOURCE IP==10.0.0.1}), a conflict does exist when the action primitive of the active flow is DROP because the action primitive of the converted local controller command is NORMAL.

If the conflict detector 204 determines that an action primitive of the converted local controller command does not conflict with an active flow in the active flow repository 212, the conflict detector 204 may signal to the local controller command handler 202 that no conflict exists and, at operation 308, the local controller command handler 202 may update the traffic forwarding table 208 to include the feature represented in the local controller command. Further, the conflict detector 204 may add the match primitives and action primitives of the converted local controller command to the normalized command repository 210.

However, if the conflict detector 204 does determine that an action primitive of the converted local controller command does conflict with an active flow stored in the active flow repository 212, the conflict detector 204 may report the conflict. A number of techniques may be used to report a conflict. For example, in some cases, a conflict may be reported by the conflict detector 204 using SNMP (Simple Network Management Protocol), Syslog, OpenFlow error messages, OpenFlow Notifications Framework, or any other suitable reporting mechanism. The conflict can be reported to the network management device 102*a*, the remote controller 104, or both.

Figure 4:
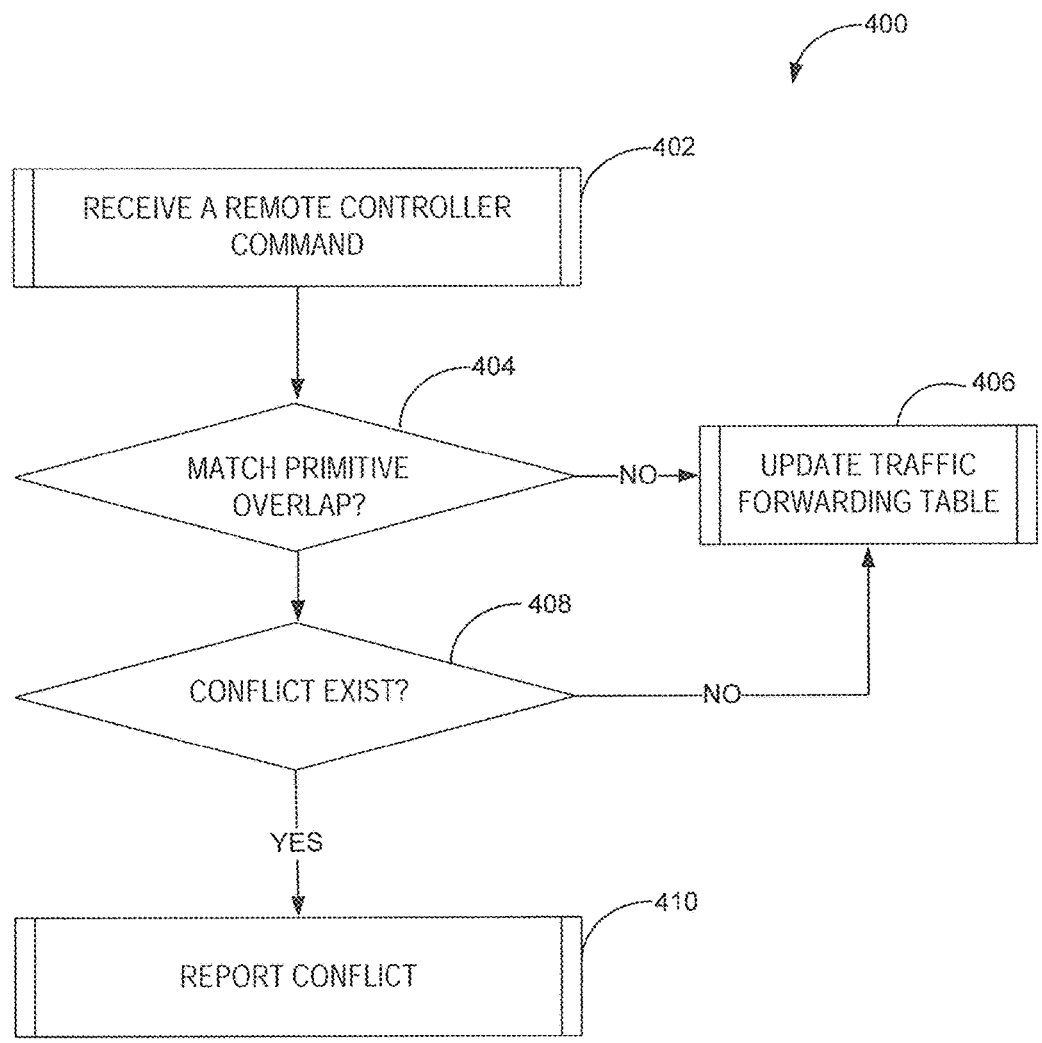
FIG. 4 is a flowchart illustrating a method of detecting and reporting a conflict between a remote controller command and an active feature, according to an example.

Accordingly, the method 300 may be used in some cases to detect and report a conflict between a local controller command and active flows being managed by a hybrid networking device. Additionally or alternatively, in some cases, a remote controller command may conflict with an active feature that is enabled within a hybrid network device. FIG. 4 is a flowchart illustrating a method 400 for detecting and reporting a conflict between a remote controller command and an active feature.

The method 400 may begin at operation 402 when the remote controller command handler 206 receives a remote controller command from, for example, the remote controller 104. In comparison to the method 300, the remote controller command handler 206 may leave the remote controller command unconverted because the native format for a remote controller command may be a match-action pair. For example, the remote controller command may include the following match-action pairs in rules sent down by it to the network device:

| MATCH PRIMITIVE | ACTION PRIMITIVE |
| --- | --- |
| {IN_PORT == 23, ETHERTYPE == 0x0800 (IP), SOURCE IP == 10.0.0.1} | NORMAL |
| {IN_PORT == 23, ETHERTYPE == 0x0800} | DROP |

At decision 404, the conflict detector 204 may determine whether the match primitive of the remote controller command matches any of the normalized local controller commands stored, for example, in the normalized command repository 210. If the conflict detector 204 determines that the match primitive of the remote controller command does not match one of the normalized local controller commands stored in the normalized command repository 210, the conflict detector 204 may then update the traffic forwarding table 208 to reflect an additional flow represented by the remote controller command. Further, the conflict detector 204 may add the remote controller command to the active flow repository 212.

If the conflict detector 204 determines that the match primitive of the remote controller command does not match one or the normalized local controller commands stored in the normalized command repository 210, the conflict detector 204 may then update the traffic forwarding table 208 to reflect an additional flow represented by the remote controller command. Further, the conflict detector 204 may add the remote controller command to the active flow repository 212.

If the conflict detector 204 determines that the match primitive of the remote controller command matches one or the normalized local controller commands stored in the normalized command repository 210, the conflict detector 204 may then, at decision 408, determine whether a conflict exists between the remote controller command and one of the active features represented in the normalized command repository 210. If the conflict detector 204 determines that a conflict does not exist between the remote controller command and one of the active features represented in the normalized command repository 210, the conflict detector 204 may then update the traffic forwarding table 208 to reflect an additional flow represented by the remote controller command. Further, the conflict detector 204 may add the remote controller command to the active flow repository 212.

If the conflict detector 204 determines that a conflict does exist between the remote controller command and one of the active features represented in the normalized command repository 210, the conflict detector 204 may, at operation 410, report the conflict. As described above, a number of techniques may be used to report a conflict. For example, in some cases, a conflict may be reported by the conflict detector 204 using SNMP, Syslog, OpenFlow error messages, OpenFlow Notifications Framework, or any other suitable reporting mechanism. The conflict can be reported to any one of the network management devices 102*a-c*, the remote controller 104, or some combination thereof.

As discussed above, the conflict detector 204 may report a conflict if one is detected. In some cases, the conflict detector 204 may distinguish between different levels of conflicts. A lower severity conflict (referred herein to as a conflict warning) may be used to signal a conflict that results in actions that vary by degree. For example, consider a case where an active flow includes a match-action primitive for rate limiting packets communicated from a given address. If local controller command is received that also rate limits the same address, but at a different level, the conflict detector 204 may designate such a conflict as a warning. However, if the case is such that an active flow includes a match-action primitive for denying packets received on a given port from a given address and if a local controller command is received that allows packets on that port from that given address, the conflict detector 204 may designate such a conflict as an error.

Additional sample conversions between local controller commands and remote controller commands are now presented. The following local controller command may specify an ACL for a virtual LAN:

permit tcp any any
deny udp any any
deny ip any any

The conflict detector 204 may convert the above local controller command to the following match-action pairs:

| MATCH PRIMITIVE | ACTION PRIMITIVE |
| --- | --- |
| {IN_VLAN == 10, Ethertype == 0x0800 (IP), NW_PROTO == 6 (TCP)} | NORMAL |
| {IN_VLAN == 10, Ethertype == 0x0800 (IP), NW_PROTO == 17 (UDP)} | DROP |
| {IN_VLAN == 10, Ethertype = 0x0800} | DROP |

As another example, the following specify a QoS that rate limits an action:

match ip 1.2.3.4 apply "100 kbps rate-limit"

The conflict detector 204 may convert the above local controller command to the following match-action pairs:

| MATCH PRIMITIVE | ACTION PRIMITIVE |
|---|---|
| {IN_PORT == 1, Ethertype == 0x0800 (IP), SOURCE IP == 1.2.3.4} | Meter - 100 kbps |

Figure 5:
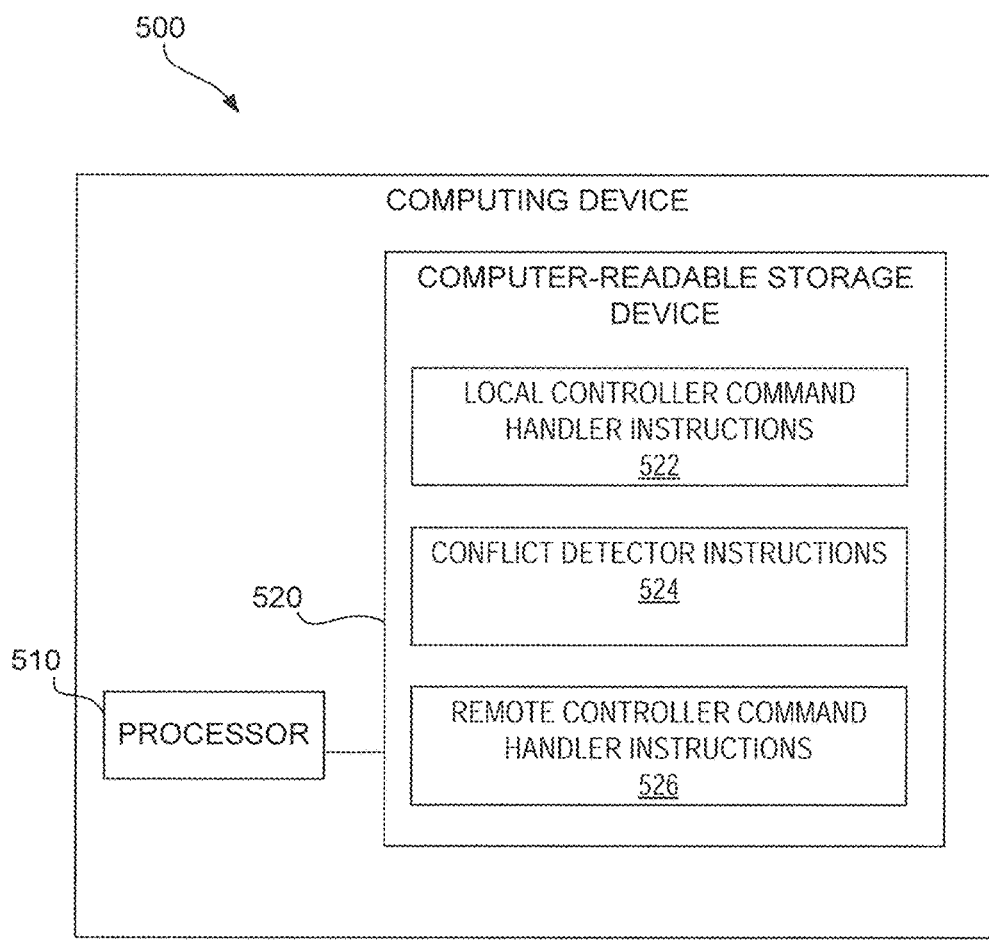
FIG. 5 is a block diagram of a computing device capable of detecting and reporting conflicts between local controller commands and remote controller commands, according to one example.

FIG. 5 is a block diagram of a computing device 500 capable of detecting and reporting conflicts between local controller commands and remote controller commands, according to one example. The computing device 500 includes, for example, a processor 510, and a computer-readable storage device 520 including instructions 522, 524, 526. The computing device 500 may be, for example, a security appliance, a computer, a workstation, a server, a notebook computer, or any other suitable computing device capable of providing the functionality described herein.

The processor 510 may be, at least one central processing unit (CPU), at least one semiconductor-based microprocessor, at least one graphics processing unit (GPU), other hardware devices suitable for retrieval and execution of instructions stored in computer-readable storage device 520, or combinations thereof. For example, the processor 510 may include multiple cores on a chip, include multiple cores across multiple chips, multiple cores across multiple devices, or combinations thereof. The processor 510 may fetch, decode, and execute one or more of the instructions 522, 524, 526 to implement methods and operations discussed above, with reference to FIGS. 1-4. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Computer-readable storage device 520 may be any electronic, magnetic, optical, or other physical storage device that contains or stores executable instructions. Thus, computer-readable storage device may be, for example, Random Access Memory (RAM), an Electrically Erasable Programmable Read-Only Memory (EEPROM), a storage drive, a Compact Disc Read Only Memory (CD-ROM), and the like. As such, the machine-readable storage device can be non-transitory. As described in detail herein, computer-readable storage device 520 may be encoded with a series of executable instructions for detecting and/or reporting conflicts in a hybrid network device.

As used herein, the term "computer system" may refer to one or more computer devices, such as the computer device 500 shown in FIG. 5. Further, the terms "couple," "couples," "communicatively couple," or "communicatively coupled" is intended to mean either an indirect or direct connection. Thus, if a first device, module, or engine couples to a second device, module, or engine, that connection may be through a direct connection, or through an indirect connection via other devices, modules, or engines and connections. In the case of electrical connections, such coupling may be direct, indirect, through an optical connection, or through a wireless electrical connection.

What is claimed is:

1. A method comprising:
   receiving, by a hybrid network device configured to receive both local controller commands from a local-controller based network and to receive remote controller commands from a software defined network, the hybrid network device to receive a local controller command from a network management device on the software defined network;
   converting, by the hybrid network device, the local controller command having a first syntax to a software defined command format having a second syntax;
   detecting, by the hybrid network device, a lack of conflict between the converted local controller command and existing flows for the software defined network represented in an active flow repository within the software defined network; and
   based on the detected lack of conflict between the converted local controller command and existing flows for the software defined network, updating a traffic forwarding table of the hybrid network device according to the local controller command.

2. The method of claim 1, wherein the converted local controller command includes a match-action pair derived from data in the local controller command, the match-action pair including a match primitive and an action primitive.

3. The method of claim 2, wherein detecting the lack of conflict between the converted local controller command and the existing flows represented in the active flow repository comprises:
   comparing the match primitive against match primitives of the existing flows represented in the active flow repository; and
   determining, based on the comparing, that the match primitive does not overlap with the existing flows.

4. The method of claim 2, wherein detecting the lack of conflict between the converted local controller command and the existing flows represented in the active flow repository comprises:
   comparing the action primitive against action primitives of the existing flows represented in the active flow repository; and
   determining, based on the comparing, that the action primitive does not conflict with the existing flows.

5. The method of claim 1, further comprising:
   receiving, by the hybrid network device, an additional local controller command from the network management device;
   converting, by the hybrid network device, the additional local controller command to the software defined command format;
   detecting a conflict between the converted additional local controller command and the existing flows represented in the active flow repository; and
   based on detecting the conflict, reporting the conflict to a remote controller communicatively coupled to the hybrid network device.

6. The method of claim 5, wherein detecting the conflict between the converted additional local controller command and the existing flows represented in the active flow repository comprises determining a conflict level of the conflict, and wherein reporting the conflict to the remote controller includes reporting the conflict level.

7. The method of claim 6, further comprising:
   responsive to the conflict level being a warning, updating the traffic forwarding table of the hybrid network device according to the additional local controller command.

8. The method of claim 1, further comprising:
receiving, by the hybrid network device, an additional local controller command from the network management device;
converting, by the hybrid network device, the additional local controller command to the software defined command format;
detecting a conflict between the converted additional local controller command and the existing flows represented in the active flow repository; and
based on detecting the conflict, reporting the conflict to the network management device.

9. The method of claim 1, further comprising:
based on the detected lack of conflict, storing the local controller command in a normalized command repository.

10. The method of claim 1, wherein the local controller command relates to at least one of: a quality of service command, an access control list command, or a routing protocol command.

11. A hybrid network device, comprising:
a processor configured to receive both local controller commands from a local-controller based network and to receive remote controller commands from a software defined network, the hybrid network device to receive a local controller command from a network management device on the software defined network; and
a non-transitory computer-readable storage device to store
a traffic forwarding table to store active flows for handling traffic on the software defined network,
a normalized command repository to store match primitives and action primitives converted from local controller commands that correspond to active features,
remote controller command handler instructions executable by the processor to receive a remote controller command, and
conflict detector instructions executable by the processor to:
detect a lack of conflict between the converted remote controller command and the match primitives and the action primitives, and
based on the detected lack of conflict between the active flows in the traffic forwarding table and the converted remote controller command, updating update the traffic forwarding table according to the remote controller command.

12. The hybrid network device of claim 11, wherein the remote controller command includes a match-action pair.

13. The hybrid network device of claim 11, wherein the conflict detector instructions are further executable by the processor to:
store the remote controller command in a remote controller command repository.

14. The hybrid network device of claim 11, wherein the remote controller command relates to at least one of: a quality of service command, an access control list command, or a routing protocol command.

15. A non-transitory computer-readable storage device comprising instructions that, when executed, cause a processor of a computer hybrid network device to:
receive, by the computer hybrid network device configured to receive both local controller commands from a local-controller based network and to receive remote controller commands from a software defined network, the hybrid network device to receive a local controller command from a network management device on the software defined network;
convert, by the computer hybrid network device, the local controller command having a first syntax to a software defined command format having a second syntax;
determine, by the computer hybrid network device, whether there is a conflict between the converted local controller command and existing flows for the software defined network represented in an active flow repository within the software defined network; and
based on a determined lack of conflict between the converted local controller command and existing flows for the software defined network, update a traffic forwarding table of the computer hybrid network device according to the local controller command.

16. The non-transitory computer-readable storage device of claim 15, wherein the converted local controller command includes a match-action pair derived from data in the local controller command, the match-action pair including a match primitive and an action primitive.

17. The non-transitory computer-readable storage device of claim 16, wherein detecting the lack of conflict between the converted local controller command and the existing flows represented in the active flow repository comprises:
comparing the match primitive against match primitives of the existing flows represented in the active flow repository; and
determining, based on the comparing, that the match primitive does not overlap with the existing flows.

18. The non-transitory computer-readable storage device of claim 16, wherein detecting the lack of conflict between the converted local controller command and the existing flows represented in the active flow repository comprises:
comparing the action primitive against action primitives of the existing flows represented in the active flow repository; and
determining, based on the comparing, that the action primitive does not conflict with the existing flows.

19. The non-transitory computer-readable storage device of claim 15, further comprising instructions that, when executed, cause a processor of a computer hybrid network device to:
receive, by the computer hybrid network device, an additional local controller command from the network management device;
converting, by the computer hybrid network device, the additional local controller command to the software defined command format;
detecting a conflict between the converted additional local controller command and the existing flows represented in the active flow repository; and
based on detecting the conflict, reporting the conflict to a remote controller communicatively coupled to the computer hybrid network device.

20. The non-transitory computer-readable storage device of claim 15, further comprising instructions that, when executed, cause a processor of a computer hybrid network device to:
receiving, by the computer hybrid network device, an additional local controller command from the network management device;
converting, by the computer hybrid network device, the additional local controller command to the software defined command format;

detecting a conflict between the converted additional local controller command and the existing flows represented in the active flow repository; and based on detecting the conflict, reporting the conflict to the network management device.

* * * * *